United States Patent
Kuno et al.

(10) Patent No.: US 11,141,713 B2
(45) Date of Patent: Oct. 12, 2021

(54) EXHAUST GAS PURIFICATION CATALYST AND EXHAUST GAS PURIFICATION METHOD USING THE SAME

(71) Applicant: UMICORE SHOKUBAI JAPAN CO., LTD., Tokoname (JP)

(72) Inventors: Hirotaka Kuno, Himeji (JP); Takahiro Ikegami, Himeji (JP); Kosuke Mikita, Himeji (JP); Masashi Nakashima, Himeji (JP); Shigekazu Minami, Himeji (JP); Masanori Ikeda, Himeji (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 135 days.

(21) Appl. No.: 16/607,405

(22) PCT Filed: Apr. 26, 2018

(86) PCT No.: PCT/JP2018/017025
§ 371 (c)(1),
(2) Date: Oct. 23, 2019

(87) PCT Pub. No.: WO2018/199250
PCT Pub. Date: Nov. 1, 2018

(65) Prior Publication Data
US 2020/0129962 A1  Apr. 30, 2020

(30) Foreign Application Priority Data
Apr. 28, 2017  (JP) .............................. JP2017-090254

(51) Int. Cl.
*B01J 23/63*  (2006.01)
*B01J 35/04*  (2006.01)
*B01D 53/86*  (2006.01)

(52) U.S. Cl.
CPC ............ *B01J 23/63* (2013.01); *B01D 53/865* (2013.01); *B01J 35/04* (2013.01);
(Continued)

(58) Field of Classification Search
CPC ......... B01J 23/63; B01J 35/04; B01D 53/865; B01D 2255/1023; B01D 2255/1025;
(Continued)

(56) References Cited

U.S. PATENT DOCUMENTS 6,375,910 B1 *  4/2002  Deeba .................. F01N 3/0814
                                                    423/239.1
7,081,430 B2 *  7/2006  Uenishi ................... B01J 23/63
                                                    502/327
(Continued)

FOREIGN PATENT DOCUMENTS

JP  2005-505403 A  2/2005
JP  2010-005590 A  1/2010
(Continued)

OTHER PUBLICATIONS

Notification of Transmittal of Translation of the International Preliminary Report on Patentability (Forms PCT/IB338, PCT/IB/373 and PCT/ISA/237) dated Nov. 7, 2019, by the International Bureau of WIPO in corresponding International Application No. PCT/JP2018/017025. (13 pages).
(Continued)

*Primary Examiner* — Cam N. Nguyen
(74) *Attorney, Agent, or Firm* — Buchanan Ingersoll & Rooney PC

(57) ABSTRACT

In order to provide an exhaust gas purification catalyst capable of purifying hydrocarbons, carbon monoxide, and nitrogen oxides in exhaust gas at low temperatures, the exhaust gas purification catalyst according to the present invention includes: a region (2) containing palladium on a
(Continued)

three-dimensional structure (1), and a first region (3) and a second region (4) provided on the region (2) in order from an inflow side of exhaust gas to an outflow side of exhaust gas. The concentration of rhodium contained in the first region (3) is higher than the concentration of rhodium contained in the second region (4).

15 Claims, 3 Drawing Sheets

(52) U.S. Cl.
CPC ............... *B01D 2255/1023* (2013.01); *B01D 2255/1025* (2013.01); *B01D 2255/2065* (2013.01); *B01D 2255/9022* (2013.01); *B01D 2257/404* (2013.01); *B01D 2257/502* (2013.01); *B01D 2257/702* (2013.01); *B01D 2258/01* (2013.01)

(58) Field of Classification Search
CPC .... B01D 2255/2065; B01D 2255/9022; B01D 2257/404; B01D 2257/502; B01D 2257/702; B01D 2258/01
See application file for complete search history.

(56) References Cited

U.S. PATENT DOCUMENTS

| | | | | |
|---|---|---|---|---|
| 7,446,076 B2* | | 11/2008 | Miyoshi | B01J 23/40 502/326 |
| 7,767,164 B2* | | 8/2010 | Matsuzono | B01J 37/0215 422/180 |
| 8,066,963 B2* | | 11/2011 | Klingmann | B01J 23/002 423/213.5 |
| 8,071,502 B2* | | 12/2011 | Shimizu | B01J 35/0006 502/325 |
| 8,211,824 B2* | | 7/2012 | Akamine | B01J 23/63 502/332 |
| 8,501,661 B2* | | 8/2013 | Sunada | B01D 53/945 502/325 |
| 8,551,908 B2* | | 10/2013 | Satou | B01D 53/945 502/327 |
| 8,557,204 B2* | | 10/2013 | Nunan | B01D 53/9472 423/213.5 |
| 8,617,496 B2* | | 12/2013 | Wei | B01J 37/0248 423/213.2 |
| 8,640,440 B2* | | 2/2014 | Klingmann | B01J 35/04 60/274 |
| 8,713,921 B2* | | 5/2014 | Akamine | F01N 13/009 60/299 |
| 8,784,759 B2* | | 7/2014 | Hilgendorff | B01J 37/0036 423/213.5 |
| 8,828,343 B2* | 9/2014 | Liu | B01D 53/945 423/213.5 |
| 8,927,454 B2* | 1/2015 | Itou | B01J 37/0244 502/339 |
| 9,283,547 B2* | 3/2016 | Alive | B01J 37/348 |
| 9,486,793 B2* | 11/2016 | Klingmann | B01J 21/04 |
| 9,522,360 B2* | 12/2016 | Schmidt | B01D 53/945 |
| 9,540,980 B2* | 1/2017 | Hilgendorff | B01J 35/1014 |
| 9,579,633 B2* | 2/2017 | Suzuki | B01J 23/63 |
| 9,604,175 B2* | 3/2017 | Hatfield | B01J 35/04 |
| 9,616,410 B2* | 4/2017 | Okada | F01N 3/2807 |
| 9,636,634 B2* | 5/2017 | Chiffey | B01J 35/0006 |
| 9,656,209 B2* | 5/2017 | Chang | F01N 3/101 |
| 9,662,638 B2* | 5/2017 | Hoyer | F01N 3/0842 |
| 9,707,542 B2* | 7/2017 | Bergeal | B01J 35/0006 |
| 9,782,753 B2* | 10/2017 | Aoki | B01J 35/04 |
| 9,833,771 B2* | 12/2017 | Goto | B01J 23/63 |
| 9,839,902 B2* | 12/2017 | Suzuki | B01J 35/1014 |
| 9,873,085 B2* | 1/2018 | Yoshida | B01J 23/42 |
| 9,890,676 B2* | 2/2018 | Kawabata | B01J 37/0248 |
| 9,999,871 B2* | 6/2018 | Aoki | B01J 35/04 |
| 10,010,873 B2* | 7/2018 | Aoki | F01N 3/10 |
| 10,150,082 B2* | 12/2018 | Yoshikawa | B01J 37/0244 |
| 10,201,805 B2* | 2/2019 | Ohashi | B01D 53/9454 |
| 10,213,741 B2* | 2/2019 | Sato | B01J 37/0244 |
| 10,512,898 B2* | 12/2019 | Deeba | B01D 53/945 |
| 10,569,257 B2* | 2/2020 | Chiffey | B01J 37/0246 |
| 2003/0061860 A1 | 4/2003 | Hu et al. | |
| 2007/0014705 A1 | 1/2007 | Chen | |
| 2008/0016857 A1 | 1/2008 | Hu et al. | |
| 2008/0081762 A1 | 4/2008 | Kitamura et al. | |
| 2009/0041643 A1 | 2/2009 | Deeba et al. | |
| 2009/0042722 A1 | 2/2009 | Hu et al. | |
| 2011/0305615 A1* | 12/2011 | Hilgendorff | B01J 23/58 423/213.5 |
| 2015/0125370 A1* | 5/2015 | Klingmann | B01J 37/0244 423/213.5 |
| 2016/0158699 A1* | 6/2016 | Cavataio | B01J 35/04 422/171 |
| 2016/0199815 A1 | 7/2016 | Hoshino et al. | |
| 2016/0256854 A1 | 9/2016 | Aoki | |

FOREIGN PATENT DOCUMENTS

| | | |
|---|---|---|
| JP | 2013-006179 A | 1/2013 |
| JP | 2015-073943 A | 4/2015 |
| JP | 2015-151970 A | 8/2015 |
| WO | 2006/057067 A1 | 6/2006 |
| WO | 2015/087871 A1 | 6/2015 |

OTHER PUBLICATIONS

International Search Report dated Jul. 3, 2018, by the Japanese Patent Office in corresponding International Application No. PCT/JP2018/017025. (2 pages).

* cited by examiner

EXHAUST GAS PURIFICATION CATALYST AND EXHAUST GAS PURIFICATION METHOD USING THE SAME

TECHNICAL FIELD

The present invention relates to an exhaust gas purification catalyst and an exhaust gas purification method using such an exhaust gas purification catalyst and more specifically relates to an exhaust gas purification catalyst capable of purifying hydrocarbons (HC), carbon monoxide (CO), and nitrogen oxides (NOx) in exhaust gas at low temperatures and an exhaust gas purification method using such an exhaust gas purification catalyst.

BACKGROUND OF THE INVENTION

Numerous exhaust gas purification methods have been proposed in which hydrocarbons (HC), carbon monoxide (CO), and nitrogen oxides (NOx) are removed simultaneously from exhaust gas.

For example, technology has been proposed in which a catalyst component is overlap-coated onto a catalyst support and the concentration of precious metals contained in this overlapping part is changed, thereby even when the poisoning components contained in exhaust gas adhere to the catalyst, a fixed amount of the catalytically active component is protected from the poisoning material, and thus a reduction in the activity of the catalyst due to the catalytically active component becoming poisoned does not occur (Patent Document 1). Furthermore, in order to improve the contact efficiency between the oxygen storage component contained in the catalyst and the exhaust gas, a technique for overlap-coating the catalyst has been proposed (Patent Document 2). Technology has also been proposed for the purpose of purifying HC and NOx in exhaust gas by overlap-coating the catalyst component in consideration of the activity of each of the precious metals of Pt, Pd, and Rh and by dividing the regions where the Pt and Pd, which are contained in portions directly coated onto the support, are present (Patent Document 3).

However, exhaust gas regulations are becoming increasingly strict with the passage of time, and known exhaust gas purification catalysts cannot sufficiently satisfy the stricter regulations. In particular, currently, the performance of rhodium, which is effective in reducing NOx, cannot be fully utilized. For example, when exhaust gas contacts the catalyst, the concentrations of oxygen and components to be purified such as NOx are changed, thereby the purification (treatment) amount of components to be purified varies from the exhaust gas inlet side to the outlet side, and thus it is difficult to sufficiently clean the exhaust gas. More specifically, for example, when an automobile transitions from an idling state to a moving state, a large amount of high-temperature exhaust gas is instantaneously produced and is introduced into the exhaust gas purification catalyst. However, the temperature of the exhaust gas purification catalyst is lower than that of the exhaust gas. Therefore, it is difficult to immediately purify exhaust gas with known exhaust gas purification catalysts. That is, known exhaust gas purification catalysts have low catalytic responsiveness to exhaust gas.

CITATION LIST

Patent Literature

Patent Document 1: JP 2013-6179 A
Patent Document 2: JP 2005-505403 A
Patent Document 3: JP 2010-5590 A

SUMMARY OF THE INVENTION

Technical Problem

The technologies disclosed in Patent Documents 1 to 3 are limited to merely purifying the HC and NOx in exhaust gas and are not sufficient for application when the temperature of the exhaust gas is low.

The present invention was conceived in view of the problems described above, and an object of the present invention is to provide an exhaust gas purification catalyst capable of efficiently purifying HC, CO, and NOx in exhaust gas discharged at low temperatures at which it is difficult for the catalyst to act sufficiently and to provide an exhaust gas purification method using such an exhaust gas purification catalyst. The exhaust gas purification catalyst and the exhaust gas purification method using such an exhaust gas purification catalyst according to the present invention can purify NOx at low temperatures. In particular, an object of the present invention is to provide a purification catalyst with excellent responsiveness and an exhaust gas purification method using such an exhaust gas purification catalyst, which are capable of treating large amounts of high-temperature exhaust gas even when conditions change from a state in which a small amount of low-temperature exhaust gas is being introduced to a state in which a large amount of high-temperature exhaust gas is instantaneously introduced, that is, not only when the temperature of the exhaust gas suddenly rises, but also when the space velocity with respect to the catalyst (capacity (h−1) per unit time of exhaust gas passing through a catalyst of a unit volume) has suddenly increased. Furthermore, the exhaust gas purification catalyst according to the present invention is a catalyst that exhibits durability and can purify NOx for a long period of time.

Solution to Problem

As a result of diligent research to solve the problems described above, the present inventors discovered the below-described exhaust gas purification catalyst and thereby arrived at the completion of the present invention.

That is, the exhaust gas purification catalyst according to the present invention includes: a region containing palladium, the region being provided on a three-dimensional structure; and a first region and a second region being provided on the region containing palladium in order from an inflow side of exhaust gas to an outflow side of exhaust gas, and the concentration of rhodium contained in the first region is higher than the concentration of rhodium contained in the second region.

Advantageous Effects of Invention

According to the present invention, an exhaust gas purification catalyst capable of efficiently purifying hydrocarbons (HC), carbon monoxide (CO), and nitrogen oxides (NOx) in exhaust gas discharged at low temperatures at which it is difficult for the catalyst to act sufficiently and an exhaust gas purification method using such an exhaust gas purification catalyst can be provided.

DESCRIPTION OF EMBODIMENTS

Figure 1:
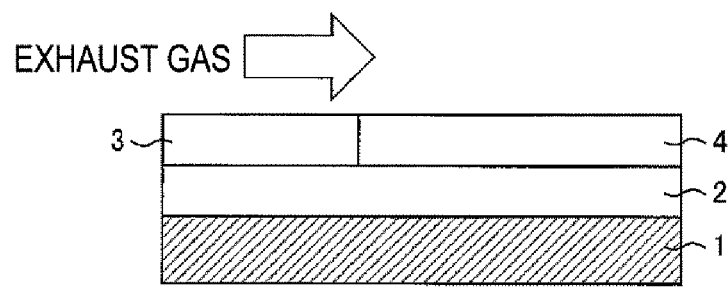
FIG. 1 is a cross section view illustrating a schematic configuration of an exhaust gas purification catalyst according to an embodiment (Example 1).

Embodiments of the present invention will be described in detail below. However, the present invention is not limited thereto, various modifications are possible within the scope described, and embodiments obtained by appropriately combining technical means disclosed in the different embodiments are also included in the technical scope of the present invention. Note that, unless otherwise indicated herein, "from A to B" representing a numerical range of "from A or more to B or less." Furthermore, when there are characteristics related to mass or physical properties with respect to each element, a separate formula, substance name, and the like will be given.

An exhaust gas purification catalyst (hereinafter, may be described merely as "catalyst") according to an embodiment of the present invention includes: a region containing palladium, the region being provided on a three-dimensional structure; and a first region and a second region being provided on the region containing palladium in order from an inflow side of exhaust gas to an outflow side of exhaust gas, and the concentration of rhodium contained in the first region is higher than the concentration of rhodium contained in the second region. Furthermore, (i) the concentration of rhodium contained in the first region is more preferably from 2 to 5 times the concentration of rhodium contained in the second region, (ii) the concentration of cerium contained in the region containing palladium is more preferably higher than the concentration of cerium contained in either the first region and/or the concentration of cerium contained in the second region, (iii) the concentration of cerium contained in the second region is higher than the concentration of cerium contained in the first region, and (iv) when the cerium in the region containing palladium is a cerium complex oxide (3), the cerium in the first region is a cerium complex oxide (1) and the cerium in the second region is a cerium complex oxide (2), more preferably, the cerium complex oxide (3) has a higher concentration of cerium (in terms of the concentration of $CeO_2$, same hereinafter) than either the cerium oxide (1) and/or the cerium oxide (2). In addition, the exhaust gas purification method according to an embodiment of the present invention uses the exhaust gas purification catalyst to purify exhaust gas.

Three-Dimensional Structure

Although the three-dimensional structure used in an embodiment of the present invention is not particularly limited as long as the three-dimensional structure is capable of providing the region containing palladium on the surface thereof, the three-dimensional structure is preferably a structure having a shape that is normally used as a catalyst support such as a flow-through honeycomb, plug honeycomb, corrugated honeycomb, plate, or wave-plate, and a flow-through honeycomb shaped structure is more preferable. The material of the three-dimensional structure is not particularly limited as long as the material has heat resistance, and iron-based metals such as stainless steel; and ceramics such as cordierite, SiC, and alumina can be suitably used.

Three-dimensional structures are commercially available as three-dimensional structures for exhaust gas purification, and such structures can be used. A desirable size and shape of the three-dimensional structure can be appropriately selected according to the amount of exhaust gas to be treated.

The length of the three-dimensional structure is not greater than 200 mm, preferably not greater than 160 mm, more preferably not greater than 120 mm, and most preferably not greater than 100 mm and is not less than 30 mm, preferably not less than 50 mm, even more preferably not less than 60 mm, and most preferably not less than 70 mm.

An appropriate diameter of the cross-section of the three-dimensional structure is not less than 60 mm and preferably not less than 70 mm and is not greater than 120 mm and preferably not greater than 100 mm.

When the three-dimensional structure has holes, the shape of the holes may be any shape such as triangular, square, hexagonal, or circular but is preferably a square or hexagonal shape. The number of holes is preferably from 15 holes/cm$^2$ to 190 holes/cm$^2$ and more preferably from 60 holes/cm$^2$ to 140 holes/cm$^2$.

The volume of the three-dimensional structure is not less than 0.4 liters (hereinafter, may be referred to as "L"), preferably not less than 0.5 L, and more preferably not less than 0.6 L and is also not greater than 2.0 L, preferably not greater than 1.6 L, and even more preferably not greater than 1.4 L.

Region Containing Palladium

A region containing palladium is provided on the three-dimensional structure. The region containing palladium need only contain at least palladium. The amount of palladium contained in the region is, in terms of metal, not less than 0.1 g/L (hereinafter, the amount of each component per liter of the three-dimensional structure may be described as "g/L"; the same applies to the claims), more preferably not less than 0.2 g/L, even more preferably not less than 0.4 g/L, and most preferably not less than 2 g/L relative to the three-dimensional structure. When the amount of palladium is less than 0.1 g/L, the reaction sites in the three-dimensional structure are insufficient. Moreover, the amount of palladium contained in the region is, in terms of metal, not greater than 20 g/L, more preferably not greater than 15 g/L, even more preferably not greater than 10 g/L, and most preferably not greater than 5 g/L relative to the three-dimensional structure. When the amount of palladium exceeds 20 g/L, the reaction efficiency decreases.

The concentration of palladium contained in the region is preferably not less than 1 mass % and more preferably not less than 3 mass % and is preferably not greater than 10 mass % and more preferably not greater than 8 mass %. "Concentration" in the present specification is the percentage (%) of the mass of each component relative to the mass of the total of all components contained in the region of interest. Hereinafter, the description of "concentration" is the same for each component in the other regions. Note that palladium, rhodium, and platinum are expressed in terms of metal, and other components are expressed in terms of oxide, respectively.

Platinum and rhodium may be contained in the region, as necessary, but the amounts of platinum and rhodium are preferably small in order to emphasize the effect of palladium.

Nitrates, chloride salts, and the like can be used as raw materials for palladium, platinum, and rhodium (collectively described as "precious metals"), and nitrates are more preferable.

The length of the region is preferably not less than 50%, more preferably not less than 60%, even more preferably not less than 70%, and most preferably not less than 80% and is preferably not greater than 85%, more preferably not greater than 90%, even more preferably not greater than 95%, and most preferably not greater than 100% of the length of the three-dimensional structure.

Examples of components besides the precious metals contained in the region include components that are ordinarily used in catalysts including alumina such as α-alumina, γ-alumina, and θ-alumina; silica, titania, zirconia, or a mixture thereof and refractory inorganic oxides such as complex oxides thereof; alkali metal oxides; Mg; alkaline earth metal oxides; oxides of rare earth metals such as La, Ce, and Nd; and transition metal oxides. Among the above exemplary components, an oxygen storage material (for example, cerium oxide) that is capable of storing oxygen and that is a refractory inorganic oxide or a metal oxide is more preferable. A commercially available oxide can be appropriately used as the oxide described above.

Among the rare earth elements, when cerium is used, an oxide of cerium can interact as an oxygen storage material with palladium to improve the NOx purification performance at low temperatures. The amount of cerium contained in the region is, in terms of $CeO_2$, not less than 2 g/L, more preferably not less than 10 g/L, and even more preferably not less than 13 g/L relative to the three-dimensional structure. When the amount of cerium is less than 2 g/L, the amount of oxygen storage is insufficient. Furthermore, the amount of cerium is, in terms of $CeO_2$, not greater than 50 g/L and more preferably not greater than 20 g/L relative to the three-dimensional structure. When the amount of cerium exceeds 50 g/L, the heat resistance of the region is insufficient.

Cerium oxide can be used as a complex oxide (3) complexed with another metal oxide, for example, aluminum oxide and/or zirconium oxide. The amount of cerium contained in the complex oxide (3) is, in terms of $CeO_2$, not less than 20 mass %, preferably not less than 30 mass %, and more preferably not less than 40 mass % and is not greater than 70 mass %, preferably not greater than 60 mass %, and more preferably not greater than 50 mass %. When the amount of cerium is not less than 20 mass %, the effect of the cerium oxide supplying oxygen to Pd and maintaining the Pd in an oxide state is facilitated. On the other hand, when heat resistance is considered, it is effective to suppress the amount of cerium to not greater than 70 mass % and to combine the cerium with other metal oxides.

The amount of the refractory inorganic oxide used in the region is not less than 5 g/L, more preferably not less than 7 g/L, even more preferably not less than 10 g/L, and 100 g/L or less and is more preferably not greater than 80 g/L and even more preferably not greater than 70 g/L relative to the three-dimensional structure. The amount of the alkaline earth metal oxide used in the region is not less than 1 g/L and more preferably not less than 5 g/L and is also not greater than 25 g/L and more preferably not greater than 15 g/L relative to the three-dimensional structure. The amount of the rare earth metal oxide, excluding cerium, used in the region is not less than 1 g/L and more preferably not less than 5 g/L and is also not greater than 25 g/L and more preferably not greater than 15 g/L relative to the three-dimensional structure. The amount of the transition metal oxide used in the region is not less than 1 g/L and more preferably not less than 5 g/L and is also not greater than 25 g/L and more preferably not greater than 15 g/L relative to the three-dimensional structure.

When zirconia (zirconium oxide) is used for the refractory inorganic oxide, the amount of zirconium oxide is, in terms of $ZrO_2$, not less than 5 g/L and more preferably not less than 10 g/L relative to the three-dimensional structure. When the amount of zirconium oxide is less than 5 g/L, the region has insufficient heat resistance. In addition, the amount of zirconium oxide is, in terms of $ZrO_2$, not greater than 50 g/L, more preferably not greater than 30 g/L, and even more preferably not greater than 20 g/L relative to the three-dimensional structure. When the amount of zirconium oxide exceeds 50 g/L, the concentration of the other components decreases, which reduces the effect of the other components. The zirconium oxide may be a single oxide or a complex oxide.

When alumina is used for the refractory inorganic oxide, the amount of alumina is, in terms of $Al_2O_3$, not less than 5 g/L and more preferably not less than 10 g/L and is also not greater than 50 g/L, more preferably not greater than 30 g/L, and even more preferably not greater than 20 g/L relative to the three-dimensional structure. The above ranges are suitable for effective palladium dispersion.

The amount of all components provided in the region is not less than 30 g/L, more preferably not less than 50 g/L, even more preferably not less than 70 g/L, and most preferably not less than 80 g/L and is also not greater than 150 g/L, more preferably not greater than 130 g/L, and even more preferably not greater than 110 g/L relative to the three-dimensional structure.

First Region

The first region is provided on the region containing palladium at the inflow side of exhaust gas. The first region need only contain at least rhodium. The amount of rhodium is, in terms of metal, not less than 0.35 g/L (liters, same hereinafter), more preferably not less than 0.4 g/L, and even more preferably not less than 0.5 g/L and is also not greater than 1.2 g/L, more preferably not greater than 1.0 g/L, and even more preferably not greater than 0.9 g/L relative to 1 liter of the three-dimensional structure.

Examples of components besides rhodium contained in the first region include components that are ordinarily used in catalysts including alumina such as α-alumina, γ-alumina, and θ-alumina; silica, titania, zirconia, or a mixture thereof and refractory inorganic oxides such as complex oxides thereof; alkali metal oxides; alkaline earth metal oxides; rare earth metal oxides; and transition metal oxides. Among the above exemplary components, an oxygen storage material (for example, cerium oxide) that is capable of storing oxygen and that is a refractory inorganic oxide or metal oxide is more preferable, and γ-alumina, θ-alumina, zirconia, and cerium oxide are even more preferable. The total amount of the oxide used in the first region is not less than 5 g/L, preferably not less than 20 g/L, more preferably not less than 30 g/L, and also not greater than 150 g/L, and more preferably not greater than 120 g/L relative to 1 liter of the three-dimensional structure.

Using the inflow side of exhaust gas as a starting point, the length of the first region is preferably not less than 20 mm, more preferably not less than 25 mm, and even more preferably not less than 30 mm. When the length of the first region is shorter than 20 mm, precious metal is not sufficiently present at the inflow side of exhaust gas, and thus the purification rate of the exhaust gas will be low. Furthermore, using the inflow side of exhaust gas as a starting point, the length of the first region is preferably not greater than 50 mm, more preferably not greater than 40 mm, and even more preferably not greater than 35 mm. When the length of the first region is longer than 50 mm, precious metal is not supported in a concentrated manner at the inflow side of exhaust gas, and thus the purification rate of the exhaust gas will be low.

Here, the length of each of the regions is an average value of "$(L_{min}+L_{max}) \div 2$" of the shortest value $L_{min}$ and the longest value $L_{max}$ of the internal length of a region when the completed catalyst or the three-dimensional structure is divided where each of the regions are coated.

As an example of a method for confirming the coating state (coating length, coating thickness, and coating amount) of each of the below-described slurries on the three-dimensional structure, for a catalyst that was formed by applying each slurry under several coating conditions in advance, a method of breaking the catalyst and measuring the above-mentioned length, thickness, and amount by using calipers, an electronic scale, and a three-dimensional (3D) microscope or other microscope can be used. Moreover, an X-ray CT device may also be used to measure the length, thickness, and amount described above without breaking the catalyst. A suitable catalyst can be easily produced by applying each of the slurries described below under application conditions that confirm that the slurry is applied to the desired length, thickness, and amount.

When cerium is used from among the rare earth elements, an oxide of cerium can interact as an oxygen storage material with rhodium to improve the NOx purification performance at low temperatures. The amount of cerium in the case where cerium is contained is, in terms of $CeO_2$, not less than 0 g/L, preferably not less than 0.5 g/L, more preferably not less than 1 g/L, and even more preferably not less than 1.5 g/L relative to the three-dimensional structure. For an internal combustion engine having a low exhaust gas temperature, in the first region, the combustion performance of the exhaust gas may be required more than oxygen storage capacity, and in this case, it is effective to set the amount of cerium to 0 g/L. Note that setting the amount of cerium to not less than 0.5 g/L is effective for ensuring the oxygen storage amount. Furthermore, the amount of the cerium is, in terms of $CeO_2$, less than 20 g/L, more preferably less than 10 g/L, even more preferably less than 4 g/L, and particularly preferably not greater than 3 g/L relative to the three-dimensional structure. When the amount of cerium exceeds 20 g/L, rhodium is oxidized, and thus the activity of rhodium decreases.

Cerium oxide can be used for a complex oxide (1) complexed with another metal oxide, for example, aluminum oxide and/or zirconium oxide. The amount of cerium contained in the complex oxide (1) is, in terms of $CeO_2$, not less than 5 mass %, preferably not less than 10 mass %, and more preferably not less than 20 mass % and is not greater than 40 mass %, preferably less than 30 mass %, and more preferably not greater than 27 mass %. In order for the first region to effectively store oxygen and contribute to the purification of the exhaust gas when the exhaust gas is in an oxidizing atmosphere, the amount of cerium is not less than preferably 5 mass %. Furthermore, setting the amount of cerium to not greater than 50 mass % is effective for suppressing the excessive storage of oxygen in the first region.

The amount of all components provided in the first region is not less than 10 g/L, preferably not less than 15 g/L, more preferably not less than 20 g/L, and also less than 70 g/L, preferably less than 60 g/L, and even more preferably less than 50 g/L relative to the three-dimensional structure.

Second Region

The second region is provided on the region containing palladium at the outflow side of the exhaust gas and is preferably provided on the region containing palladium, at a portion where the first region is not provided at the outflow side of exhaust gas. Rhodium may or may not be contained in the second region. The amount of rhodium in the case where rhodium is contained is, in terms of metal, not less than 0.01 g/L, preferably not less than 0.1 g/L, more preferably not less than 0.2 g/L, and also not greater than 1.2 g/L, more preferably less than 0.4 g/L, and even more preferably not greater than 0.3 g/L relative to the three-dimensional structure.

The length of the second region is preferably a length from the end of the outflow side of exhaust gas of the first region to the end of the outflow side of exhaust gas of the three-dimensional structure.

Examples of components besides rhodium contained in the second region include components that are ordinarily used in catalysts including alumina such as α-alumina, γ-alumina, and θ-alumina; silica, titania, zirconia, or a mixture thereof and refractory inorganic oxides such as complex oxides of these; alkali metal oxides; alkaline earth metal oxides; rare earth metal oxides; and transition metal oxides. Among the above exemplary components, an oxygen storage material (for example, cerium oxide) that is capable of storing oxygen and is a refractory inorganic oxide or metal oxide is more preferable, and γ-alumina, θ-alumina, zirconia, and cerium oxide are even more preferable. The total amount of the abovementioned oxide used in the second region is not less than 20 g/L and more preferably not less than 25 g/L and is also not greater than 150 g/L and more preferably not greater than 120 g/L relative to the three-dimensional structure.

When cerium is used from among the rare earth elements, an oxide of cerium can interact as an oxygen storage material with rhodium to improve the NOx purification performance at low temperatures. The amount of cerium is, in terms of $CeO_2$, not less than 0.5 g/L, more preferably not less than 3.5 g/L, even more preferably not less than 4 g/L, and most preferably greater than 5 g/L relative to the three-dimensional structure. When the amount of cerium is less than 0.5 g/L, the amount of oxygen storage is insufficient. Furthermore, the amount of cerium is, in terms of $CeO_2$, not greater than 20 g/L, more preferably less than 10 g/L, and even more preferably not greater than 7 g/L relative to the three-dimensional structure. When the amount of cerium exceeds 20 g/L and rhodium is contained, the rhodium is oxidized, and therefore the activity of rhodium decreases.

Cerium oxide can be used as a complex oxide (2) complexed with another metal oxide, for example, aluminum oxide and/or zirconium oxide. The amount of cerium contained in the complex oxide (2) is, in terms of $CeO_2$, not less than 5 mass %, preferably not less than 10 mass %, and more preferably not less than 20 mass % and is not greater than 40 mass %, preferably less than 30 mass %, and more preferably not greater than 27 mass %. In order for the first region to effectively store oxygen and contribute to the purification of the exhaust gas when the exhaust gas is in an oxidizing atmosphere, the amount of cerium is preferably not less than 5 mass %. Furthermore, setting the amount of cerium to not greater than 50 mass % is effective for suppressing the excessive storage of oxygen in the first region.

The amount of all components provided in the second region is not less than 30 g/L, preferably not less than 50 g/L, more preferably not less than 60 g/L and is also not greater than 100 g/L, preferably not greater than 90 g/L, and even more preferably less than 80 g/L relative to the three-dimensional structure.

Rhodium Concentration Comparison Between Regions

With the exhaust gas purification catalyst according to an embodiment of the present invention, the concentration of rhodium contained in the first region is higher than the concentration of rhodium contained in the second region, and the concentration of rhodium contained in the first region is more preferably from 2 to 5 times the concentration of rhodium contained in the second region. The concentration of rhodium contained in each region refers to the percentage of the mass of rhodium (in terms of metal) relative to the total mass of the rhodium and the components other than rhodium in each region. When the concentration of rhodium contained in the first region is lower than the concentration of rhodium contained in the second region, the light-off characteristics of the catalyst at low temperatures diminish. Note that the light-off characteristics are characteristics expressed by the time (light-off time) at which the purification rate of the catalyst with regard to HC, CO, and NOx reaches 50% (T50) with respect to exhaust gas at a specific temperature.

The concentration of rhodium contained in the first region is, in terms of metal, not less than 0.1 mass %, more preferably not less than 0.8 mass %, even more preferably not less than 1.0 mass %, and most preferably not less than 1.5 mass %. When the concentration of rhodium contained in the first region is less than 0.1 mass %, the reaction sites in the three-dimensional structure are insufficient. Furthermore, the concentration of the rhodium is, in terms of metal, not greater than 10 mass %, more preferably not greater than 5 mass %, and even more preferably not greater than 4 mass %.

On the other hand, the concentration of rhodium contained in the second region is, in terms of metal, not less than 0 mass %, more preferably not less than 0.1 mass %, and even more preferably not less than 0.2 mass %. Furthermore, the concentration of rhodium contained in the second region is, in terms of metal, not greater than 5 mass %, more preferably not greater than 2 mass %, even more preferably less than 1.0 mass %, and most preferably not greater than 0.7 mass %. When the concentration of rhodium contained in the second region exceeds 5 mass %, the reaction efficiency decreases.

The concentrations of rhodium contained in the first region and the second region are preferably higher than the concentration of rhodium contained in the region containing palladium, and the concentration of rhodium contained in the first region is not less than 2 times and preferably not less than 3 times and is not greater than 6 times and preferably not greater than 5 times compared to the concentration of rhodium contained in the second region. Concentrations of rhodium that are within this range are advantageous because at such ranges, NOx can be treated (purified) instantly even when the temperature of the exhaust gas changes.

Cerium Concentration Comparison Between Regions

With the exhaust gas purification catalyst according to an embodiment of the present invention, the concentration of cerium contained in the region containing the palladium is more preferably higher than the concentration of cerium contained in either the first region or the second region, and even more preferably the concentration of cerium in the region containing the palladium is higher than in both the first region and the second region. The concentration of cerium contained in each region refers to the percentage of the mass of cerium (in terms of $CeO_2$) relative to the total mass of cerium (in terms of $CeO_2$) and the components other than cerium (mass of compounds contained in the region). When the concentration of cerium contained in the region containing palladium is lower than in both the first region and the second region, the oxygen storage capacity decreases.

Furthermore, the concentration of cerium contained in the second region is more preferably higher than the concentration of cerium contained in the first region. When the concentration of cerium contained in the second region is lower than the concentration of cerium contained in the first region, the oxygen storage capacity decreases.

The concentration of cerium contained in the region containing palladium is, in terms of $CeO_2$, not less than 10 mass %, more preferably not less than 13 mass %, and even more preferably not less than 14 mass % and is also not greater than 40 mass %, more preferably not greater than 25 mass %, and even more preferably not greater than 20 mass %. The concentration of cerium contained in the first region is, in terms of $CeO_2$, not less than 0 mass % and more preferably not less than 1 mass % and is also not greater than 20 mass %, more preferably less than 13 mass %, even more preferably not greater than 12 mass %, and most preferably not greater than 4 mass %. For an internal combustion engine having a low exhaust gas temperature, in the first region, the combustion performance of the exhaust gas may be required more than oxygen storage capacity, and in this case, it is effective to set the amount of cerium to 0 mass %. The concentration of cerium contained in the second region is, in terms of $CeO_2$, not less than 5 mass % and more preferably not less than 7 mass % and is also not greater than 30 mass %, more preferably less than 13 mass %, and more preferably not greater than 12 mass %.

Use of the exhaust gas purification catalyst according to the embodiment of the present invention described above allows the exhaust gas to be efficiently purified even when the temperature of the exhaust gas is low and when the space velocity is high. Here, "low temperature" indicates that the temperature of the exhaust gas at the end portion of the side of the three-dimensional structure where the exhaust gas inflows is from 100° C. to 400° C., and "space velocity is fast" refers to a velocity of not less than 80000 $h^{-1}$.

Comparison of Amounts of all Provided Components Between Regions

The amount of all components provided in each region is not particularly limited as long as the amount improves catalytic activity. (1) Preferably, the amount of all components provided in the second region is equal to or greater than that of the first region and is preferably a greater amount. (2) Furthermore, the amount of all components provided in each region is such that the amount in the region containing palladium is greater than the amount of either the first region or the amount of the second region, and preferably the amount of the region containing palladium is greater than in both the first region and the second region. (3) More preferably, the amount of all components provided in each region is such that the amount in the region containing palladium is greater than the amount in the second region, and the amount in the second region is greater than the amount in the first region. Note that the amount of all components provided in each region can be appropriately selected from the amount of each component provided in each of the regions described above.

Method for Preparing the Exhaust Gas Purification Catalyst

The method for preparing an exhaust gas purification catalyst according to an embodiment of the present invention is not particularly limited as long as it is a known preparation method used to prepare an exhaust gas purification catalyst, but an example of a more preferable preparation method will be described in detail below.

Examples of the method for preparing the exhaust gas purification catalyst include (1) a method in which a slurry a for forming a region containing palladium, a slurry b for forming a first region, and a slurry c for forming a second region are prepared, the slurry a is brought into contact with a three-dimensional structure, after which the excess slurry is removed and the three-dimensional structure is dried or calcined, subsequently the slurry b is brought into contact with a portion that becomes the first region on the region containing palladium, after which the excess slurry is removed and the three-dimensional structure is dried or calcined, subsequently the slurry c is brought into contact with a portion that becomes the second region on the region containing the palladium, after which the excess slurry is removed and the three-dimensional structure is dried or calcined, and thereby a catalyst is obtained; (2) a method in which slurries a, b and c are prepared in the same manner as in (1) above, after the region containing palladium is formed, the slurry c is brought into contact with a portion that becomes the second region on the region containing palladium, after which the excess slurry is removed and the three-dimensional structure is dried or calcined, and subsequently the slurry b is brought into contact with a portion that becomes the first region on the region containing palladium, after which the excess slurry is removed and the three-dimensional structure is dried or calcined to obtain a catalyst; and (3) a method in which a slurry d containing a component specific to the region containing palladium, a slurry e containing a component specific to the first region, a slurry f containing a component specific to the second region, and a solution containing a component common to each of the regions are prepared, the slurry d is brought into contact with a three-dimensional structure, after which the excess slurry is removed and the three-dimensional structure is dried or calcined, subsequently the slurry e is brought into contact with the portion that becomes the first region, after which the excess slurry is removed and the three-dimensional structure is dried or calcined, subsequently the slurry f is brought into contact with the portion that becomes the second region, after which the excess slurry is removed and the three-dimensional structure is dried or calcined, and finally, the three-dimensional structure after calcination is impregnated with the solution and then is dried or calcined to thereby obtain a catalyst.

The drying temperature is preferably from room temperature to approximately 150° C., and the calcination temperature is preferably from approximately 150 to 600° C. The drying and calcination conditions can be changed as appropriate in accordance with the target object.

Examples of methods for producing the slurries a to f include (1) a method in which powders of each component are wet milled to form a slurry; (2) a method in which the powder of a certain component is impregnated with a liquid (precursor) of another component and then dried or calcined to obtain a mixed powder and the mixed powder is then wet milled to form a slurry; and (3) a method in which a liquid (precursor) of another component is mixed into a powder of a certain component and the mixture was then wet milled to form a slurry. Alternatively, when the powder is a fine powder, a slurry can be produced by mixing the fine powder with an appropriate medium.

Exhaust Gas Purification Method

The exhaust gas to be subjected to (to be applied) the exhaust gas purification method according to an embodiment of the present invention is not particularly limited as long as it is an exhaust gas discharged from an internal combustion engine such as a gasoline engine, a diesel engine, or a gas turbine, but exhaust gas discharged from a gasoline engine is more preferable. Bringing the exhaust gas purification catalyst according to an embodiment of the present invention into contact with exhaust gas discharged from an internal combustion engine can purify the hydrocarbons (HC), carbon monoxide (CO), and nitrogen oxides (NOx) in the exhaust gas. In particular, while the exhaust gas purification catalyst according to an embodiment of the present invention is capable of more effectively purifying the exhaust gas when the temperature of the exhaust gas is higher than 500° C., even if the exhaust gas is preferably not greater than 500° C., more preferably not greater than 400° C., and even more preferably not greater than 350° C., the purification rate of the exhaust gas can reach not less than 50%. Here, when the time for the purification rate of the exhaust gas to reach 50% is considered to be T50, as the time (light-off time) to reach T50 becomes shorter, the exhaust gas is purified more quickly.

In addition, the exhaust gas purification catalyst according to an embodiment of the present invention can effectively purify exhaust gas even when the space velocity of the exhaust gas is preferably not less than 80000 $h^{-1}$, more preferably not less than 100000 $h^{-1}$, and even more preferably not less than 120000 $h^{-1}$. The upper limit of the space velocity of exhaust gas depends on the displacement of the engine or other internal combustion engine, but an upper limit of not greater than 500000 $h^{-1}$ is preferable.

Furthermore, even when exposed to exhaust gas at temperatures of from 800 to 1000° C. for 40 to 450 hours, the exhaust gas purification catalyst is effective and can purify HC, CO, and NOx in the exhaust gas, and therefore the exhaust gas purification catalyst can purify NOx for a long period of time and is provided with durability.

SUMMARY

As described above, the present invention includes the inventions described in (1) to (18) below.

(1) An exhaust gas purification catalyst including: a region containing palladium, the region being provided on a three-dimensional structure; and a first region and a second region being provided on the region containing palladium in order from an inflow side of exhaust gas to an outflow side of exhaust gas, wherein the concentration of rhodium contained in the first region is higher than the concentration of rhodium contained in the second region.

(2) The exhaust gas purification catalyst according to (1), wherein the concentration of rhodium contained in the first region is from 2 to 5 times the concentration of rhodium contained in the second region.

(3) The exhaust gas purification catalyst according to (1) or (2), wherein the concentration of rhodium contained in the first region is from 1.0 mass % to 10 mass %, and the concentration of rhodium contained in the second region is not less than 0 mass % and less than 5.0 mass %.

(4) The exhaust gas purification catalyst according to any one of (1) to (3), wherein an amount of rhodium contained in the first region is from 0.35 g/L to 1.2 g/L in terms of metal relative to 1 liter of the three-dimensional structure, and an amount of rhodium contained in the second region is from 0.01 g/L to 0.3 g/L in terms of metal relative to 1 liter of the three-dimensional structure.

(5) The exhaust gas purification catalyst according to any one of (1) to (4), wherein a concentration of cerium contained in the region containing palladium is higher than a concentration of cerium contained in either the first region and/or a concentration of cerium contained in the second region.

(6) The exhaust gas purification catalyst according to any one of (1) to (5), wherein the concentration of cerium contained in the second region is higher than the concentration of cerium contained in the first region.

(7) The exhaust gas purification catalyst according to any one of (1) to (6), wherein the concentration of cerium contained in the region containing palladium is from 13 mass % to 40 mass % in terms of $CeO_2$, and the concentration of cerium contained in either the first region and/or the concentration of cerium contained in the second region is not less than 0 mass % and less than 13 mass % in terms of $CeO_2$.

(8) The exhaust gas purification catalyst according to any one of (1) to (7), wherein the concentration of cerium contained in the first region is from 0 mass % to 4 mass % in terms of $CeO_2$, and the concentration of cerium contained in the second region is not less than 5 mass % and less than 13 mass % in terms of $CeO_2$.

(9) The exhaust gas purification catalyst according to any one of (1) to (8), wherein an amount of cerium contained in the region containing palladium is from 10 g/L to 50 g/L in terms of $CeO_2$ relative to 1 liter of the three-dimensional structure, and an amount of cerium contained in either the first region and/or an amount of cerium contained in the second region is not less than 0 g/L and less than 10 g/L in terms of $CeO_2$ relative to 1 liter of the three-dimensional structure.

(10) The exhaust gas purification catalyst according to any one of (1) to (9), wherein when the cerium in the region containing palladium is a cerium complex oxide (3), the cerium in the first region is a cerium complex oxide (1) and the cerium in the second region is a cerium complex oxide (2), the cerium complex oxide (3) has a higher concentration of cerium in terms of $CeO_2$ than either the cerium complex oxide (1) and/or the cerium complex oxide (2).

(11) The exhaust gas purification catalyst according to any one of (1) to (10), wherein the cerium complex oxide (2) in the second region has the same or higher concentration of cerium in terms of $CeO_2$ in comparison to the cerium complex oxide (1) in the first region.

(12) The exhaust gas purification catalyst according to any one of (1) to (11), wherein the amount of cerium contained in the cerium complex oxide (3) in the region containing palladium is from 30 mass % to 70 mass % in terms of $CeO_2$, and the amount of cerium contained in the cerium complex oxide (2) in the second region is not less than 5 mass % and less than 30 mass % in terms of $CeO_2$.

(13) The exhaust gas purification catalyst according to any one of (1) to (12), wherein an amount of palladium contained in the region containing palladium is from 0.1 g/L to 20 g/L in terms of metal relative to 1 liter of the three-dimensional structure, and a concentration of palladium contained in the region containing palladium is from 1 mass % to 10 mass %.

(14) The exhaust gas purification catalyst according to any one of (1) to (13), wherein an amount of all components provided in each region is greater in the region containing palladium than the second region and is greater in the second region than the first region; and relative 1 liter of the three-dimensional structure, the amount of all components provided in the region containing palladium is from 50 g/L to 150 g/L, the amount of all components provided in the first region is not less than 10 g/L and less than 60 g/L, and the amount of all components provided in the second region is from 50 g/L to 90 g/L.

(15) The exhaust gas purification catalyst according to any one of (1) to (14), wherein the three-dimensional structure is from 30 mm to 200 mm, the region containing palladium is from 60% to 100% relative to a length of the three-dimensional structure, the first region is from 20 mm to 50 mm, and the second region is provided on the region containing palladium, at a portion where the first region is not provided at the outflow side of exhaust gas.

(16) A method for purifying exhaust gas, comprising purifying exhaust gas using the exhaust gas purification catalyst described in any one of (1) to (15).

(17) The method for purifying exhaust gas according to (16), wherein exhaust gas having a temperature from 100° C. to 500° C. is purified.

(18) The method for purifying exhaust gas according to (16) or (17), wherein exhaust gas having a space velocity of not less than 80000 $h^{-1}$ is purified.

EXAMPLES

The present invention will be described in further detail hereinafter using examples and comparative examples, but the present invention should not be construed as being limited to these examples.

Example 1

Region Containing Palladium

An aqueous solution containing palladium was mixed with an oxide containing aluminum, a cerium complex oxide (where the cerium content was 45 mass % in terms of $CeO_2$, also containing aluminum), an oxide containing zirconium (in addition to zirconium, also containing 24 mass % of cerium in terms of $CeO_2$; and lanthanum), and barium oxide, and the mixture was then dried and calcined to obtain a powder. Water was then added to this powder, and the powder was wet milled to obtain a slurry for forming a region containing palladium. Next, a honeycomb (three-dimensional structure) made of cordierite with a length of 80 mm was immersed in the slurry, after which the excess slurry was removed, the honeycomb was dried and calcined, and thereby a region containing palladium was provided on the honeycomb. Per liter of the honeycomb, the amount of palladium was 5 g, the amount of zirconium in terms of zirconium oxide ($ZrO_2$) was 18 g, the amount of aluminum in terms of aluminum oxide ($Al_2O_3$) was 31 g, the amount of cerium in terms of cerium oxide ($CeO_2$) was 14 g, the amount of lanthanum in terms of $La_2O_3$ was 6 g, and the amount of barium in terms of BaO was 4 g. The concentration of cerium in the region was 17 mass % in terms of cerium oxide ($CeO_2$), and the concentration of palladium was 6 mass %. The amount of all components provided in the region containing palladium was 78 g/L.

First Region

Next, an aqueous solution containing rhodium and palladium was mixed with an oxide containing zirconium (the zirconium content was 73 mass % in terms of $ZrO_2$), and an oxide containing aluminum (the aluminum content was 97 mass % in terms of $Al_2O_3$), and the mixture was then dried and calcined to obtain a powder. Water was then added to this powder, and the powder was wet milled to obtain a slurry for forming the first region. Next, the honeycomb provided with the region containing palladium was immersed in the slurry for forming the first region from one end thereof to a predetermined position (the position that becomes a boundary with the second region), then the excess slurry was removed, the honeycomb was dried and calcined, and thereby a first region was provided on the region containing palladium, from the exhaust gas inlet side of the honeycomb to a length of 30 mm. Per liter of honeycomb, the amount of rhodium was 0.6 g, the amount of palladium was 0.6 g, the amount of zirconium was 16 g in terms of zirconium oxide ($ZrO_2$), and the amount of aluminum was 22 g in terms of aluminum oxide ($Al_2O_3$). The concentration of rhodium in this region was 1.3 mass %, the concentration of palladium was 1.3 mass %, and the concentration of cerium was 0 mass % in terms of cerium oxide ($CeO_2$). The amount of all components provided in the first region was 39.2 g/L.

Second Region

Next, an aqueous solution containing rhodium and palladium was mixed with an oxide containing aluminum (the aluminum content was 97 mass % in terms of $Al_2O_3$) and a cerium complex oxide (the cerium content was 23 mass % in terms of $CeO_2$, including zirconium), and the mixture was then dried and calcined to obtain a powder. Water was then added to this powder, and the powder was wet milled to obtain a slurry for forming the second region. Next, the honeycomb provided with the first region was immersed in the slurry for forming the second region from the other end to a predetermined position (the position that becomes a boundary with the first region), then the excess slurry was removed, the honeycomb was dried and calcined, and thereby a second region was provided on the region containing palladium, from the exhaust gas outlet side to a length of 50 mm. Per liter of honeycomb, the amount of rhodium was 0.3 g, the amount of palladium was 0.3 g, the amount of zirconium was 9 g in terms of zirconium oxide ($ZrO_2$), the amount of aluminum was 54 g in terms of aluminum oxide ($Al_2O_3$), and the amount of cerium was 8 g in terms of cerium oxide ($CeO_2$). The concentration of rhodium in this region was 0.3 mass %, the concentration of palladium was 0.3 mass %, and the concentration of cerium was 11 mass % in terms of cerium oxide ($CeO_2$). The amount of all components provided in the second region was 71.6 g/L.

Through this, an exhaust gas purification catalyst A was prepared. The schematic configuration of the exhaust gas purification catalyst A is illustrated in FIG. 1.

As illustrated in FIG. 1, the exhaust gas purification catalyst A of the present example has a structure in which a region 2 containing palladium is provided on a honeycomb 1 made of cordierite and in which a first region 3 and a second region 4 are provided on the region 2 containing palladium in order from an inflow side of exhaust gas to an outflow side.

Example 2

Region Containing Palladium

An aqueous solution containing palladium was mixed with barium oxide, an oxide containing aluminum (the aluminum content was 97 mass % in terms of $Al_2O_3$), and a cerium complex oxide (the cerium content was 45 mass % in terms of $CeO_2$, and the zirconium content was 44 mass % in terms of $ZrO_2$), and then the mixture was dried and calcined to obtain a powder. Water was then added to this powder, and the powder was wet milled to obtain a slurry for forming a region containing palladium. Next, a honeycomb made of cordierite with a length of 80 mm was immersed in the slurry, after which the excess slurry was removed, the honeycomb was dried and calcined, and thereby a region containing palladium was provided on the honeycomb. Per liter of honeycomb, the amount of palladium was 5 g, the amount of barium was 10 g in terms of BaO, the amount of zirconium was 15 g in terms of zirconium oxide ($ZrO_2$), the amount of aluminum was 43 g in terms of aluminum oxide ($Al_2O_3$), and the amount of cerium was 15 g in terms of cerium oxide ($CeO_2$). The concentration of cerium was 16 mass % in terms of cerium oxide ($CeO_2$), and the concentration of palladium concentration was 5 mass %. The amount of all components provided in the region containing palladium was 88 g/L.

First Region

Next, an aqueous solution containing rhodium was mixed with an oxide containing aluminum (the aluminum content was 97 mass % in terms of $Al_2O_3$); and a cerium complex oxide (the cerium content was 23 mass % in terms of $CeO_2$, the zirconium content was 24 mass % in terms of $ZrO_2$, and the aluminum content was 50 mass % in terms of $Al_2O_3$), and then the mixture was dried and calcined to obtain a powder. Water was then added to this powder, and the powder was wet milled to obtain a slurry for forming the first region. Next, the honeycomb provided with the region containing palladium was immersed in the slurry for forming the first region from one end thereof to a predetermined position (the position that becomes a boundary with the second region), then the excess slurry was removed, the honeycomb was dried and calcined, and thereby a first region was provided on the region containing palladium from the exhaust gas inlet side of the honeycomb to a length of 30 mm. Per liter of honeycomb, the amount of rhodium was 0.6 g, the amount of zirconium was 8 g in terms of zirconium oxide ($ZrO_2$), the amount of lanthanum was 4 g in terms of lanthanum oxide ($La_2O_3$), the amount of aluminum was 14 g in terms of aluminum oxide ($Al_2O_3$), and the amount of cerium was 3 g in terms of cerium oxide ($CeO_2$). The concentration of rhodium in this region was 1.9 mass %, and the concentration of cerium was 10.3 mass % in terms of cerium oxide ($CeO_2$). The amount of all components provided in the first region was 29.6 g/L.

Second Region

Next, an aqueous solution containing rhodium was mixed with an oxide containing aluminum (the aluminum content was 96 mass % in terms of $Al_2O_3$); and a cerium complex oxide (the cerium content was 23 mass % in terms of $CeO_2$, the zirconium content was 24 mass % in terms of $ZrO_2$, and the aluminum content was 50 mass % in terms of $Al_2O_3$), and then the mixture was dried and calcined to obtain a powder. Water was then added to this powder, and the powder was wet milled to obtain a slurry for forming the second region. Next, the honeycomb provided with the first region was immersed in the slurry for forming the second region from the other end to a predetermined position (the position that becomes a boundary with the first region), then the excess slurry was removed, the honeycomb was dried and calcined, and thereby a second region was provided on the region containing palladium from the exhaust gas outlet side to a length of 50 mm. Per liter of the honeycomb, the amount of rhodium was 0.3 g, the amount of zirconium was 13 g in terms of zirconium oxide ($ZrO_2$), the amount of aluminum in terms of aluminum oxide ($Al_2O_3$) was 23 g, the amount of cerium in terms of cerium oxide ($CeO_2$) was 6 g, and the amount of lanthanum in terms of lanthanum oxide ($La_2O_3$) was 6 g. The concentration of rhodium in this region was 0.5 mass %, and the concentration of cerium was 10.4 mass % in terms of cerium oxide ($CeO_2$). The amount of all components provided in the second region was 48.3 g/L.

Through this, an exhaust gas purification catalyst B was prepared.

Comparative Example 1

Region Containing Palladium

An aqueous solution containing palladium was mixed with barium oxide, an oxide containing aluminum (the aluminum content was 97 mass % in terms of $Al_2O_3$), and a cerium complex oxide (the cerium content was 45 mass % in terms of $CeO_2$, and the zirconium content was 44 mass % in terms of $ZrO_2$), and then the mixture was dried and calcined to obtain a powder. Water was then added to this powder, and the powder was wet milled to obtain a slurry for forming a region containing palladium. Next, a honeycomb made of cordierite with a length of 80 mm was immersed in the slurry, after which the excess slurry was removed, the honeycomb was dried and calcined, and thereby a region containing palladium was provided on the honeycomb. Per liter of honeycomb, the amount of palladium was 5 g, the amount of barium was 12 g in terms of barium oxide (BaO), the amount of zirconium was 16 g in terms of zirconium oxide ($ZrO_2$), the amount of aluminum was 58 g in terms of aluminum oxide ($Al_2O_3$), and the amount of cerium was 16 g in terms of cerium oxide ($CeO_2$). The concentration of cerium is 16 mass % in terms of cerium oxide ($CeO_2$), and the palladium was 4 mass %. The amount of all components provided in the region containing palladium was 107 g/L.

Surface Region

An aqueous solution containing rhodium was mixed with an oxide containing aluminum; and a cerium complex oxide (the cerium content was 24 mass % in terms of $CeO_2$, and the zirconium content was 60 mass % in terms of $ZrO_2$), and then the mixture was dried and calcined to obtain a powder. Water was then added to this powder, and the powder was wet milled to obtain a slurry for forming a surface region. Next, the honeycomb provided with the region containing palladium was immersed in the slurry for forming the surface region, then the excess slurry was removed, the honeycomb was dried and calcined, and thereby a surface region was provided on the region containing palladium. Per liter of honeycomb, the amount of rhodium was 0.6 g, the amount of zirconium was 21 g in terms of zirconium oxide, the amount of lanthanum was 9 g in terms of lanthanum oxide ($La_2O_3$), the amount of aluminum was 37 g in terms of aluminum oxide ($Al_2O_3$), and the amount of cerium was 8 g in terms of cerium oxide ($CeO_2$). The concentration of rhodium in this region was 0.7 mass %, and the concentration of cerium was 10.4 mass % in terms of cerium oxide ($CeO_2$). The amount of all components provided in the surface region was 75.6 g/L.

Through this, an exhaust gas purification catalyst C was prepared for comparison. The schematic configuration of the exhaust gas purification catalyst C is illustrated in FIG. 2.

Figure 2:
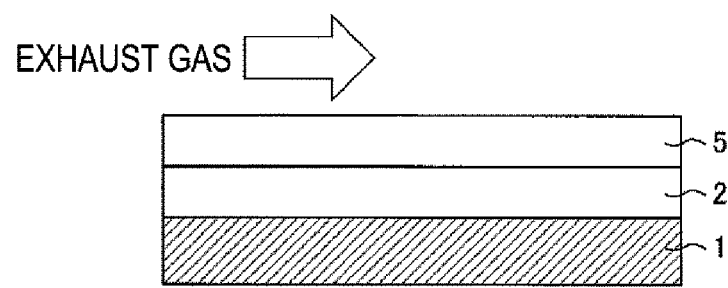
FIG. 2 is a cross section view illustrating a schematic configuration of a known exhaust gas purification catalyst (Comparative Example 1).

As illustrated in FIG. 2, the exhaust gas purification catalyst C of the comparative example has a structure in which the region 2 containing palladium is provided on the honeycomb 1 made of cordierite, and a surface region 5 is provided on the region 2 containing palladium.

Catalyst Evaluation

Figure 3:
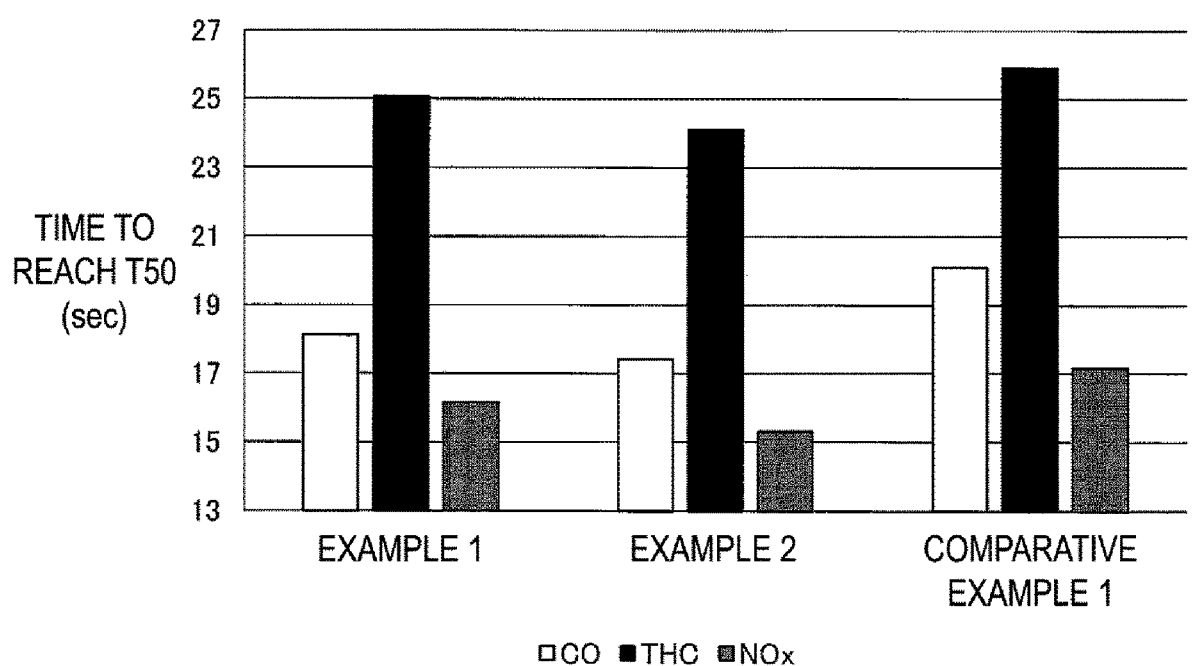
FIG. 3 is a graph showing the results of examples and comparative examples.

The exhaust gas purification catalysts A to C prepared in Examples 1 and 2 and Comparative Example 1 were separately installed in an exhaust pipe of a gasoline engine having a function of oscillating the air/fuel (A/F) ratio centered on 14.6, which is the stoichiometric ratio. The exhaust gas purification catalysts A to C were then exposed to exhaust gas having a temperature of 1000° C. for 80 hours, after which exhaust gas having a temperature of 500° C. was circulated at a space velocity of 125000 $h^{-1}$ in the exhaust gas purification catalysts A to C maintained at a temperature of 100° C., and the light-off times for the HC, CO, and NOx were measured. The results are shown in FIG. 3. Here, "light-off time" refers to the time from the point in time at which exhaust gas having a temperature of 500° C. is introduced until the purification rate of the exhaust gas purification catalysts with respect to HC, CO, and NOx reaches 50% (T50).

In the graph of FIG. 3, the examples and comparative examples are arranged on the horizontal axis, and the time (light-off time) at which T50 was reached is shown on the vertical axis. As is clear from the graph, in comparison to the catalyst (Comparative Example 1) for which the surface region is a single composition, which is widely found in prior art, the exhaust gas purification catalyst according to an embodiment of the present invention exhibited a shorter time to reach T50 with respect to all of HC (described as THC (total hydrocarbons) in FIG. 3), CO, and NOx, thus the purification rate more quickly reached 50%, and superior performance was demonstrated.

INDUSTRIAL APPLICABILITY

The exhaust gas purification catalyst and the exhaust gas purification method using the catalyst according to the present invention can be suitably used in the purification of exhaust gas discharged from an internal combustion engine such as a gasoline engine, a diesel engine, and a gas turbine.

REFERENCE SIGNS LIST

1 Honeycomb (three-dimensional structure)
2 Region containing palladium
3 First region
4 Second region
5 Surface region

The invention claimed is:

1. An exhaust gas purification catalyst comprising:
   a region containing palladium, the region being provided on a three-dimensional structure; and
   a first region and a second region being provided on the region containing palladium in order from an inflow side of exhaust gas to an outflow side of exhaust gas; wherein
   the first region and the second region comprise rhodium;
   the concentration of rhodium contained in the first region is from 2 to 5 times the concentration of rhodium contained in the second region; and
   the second region further comprises cerium, and the amount of cerium is not less than 0.5 g/L in terms of $CeO_2$ relative to 1 liter of the three-dimensional structure.

2. The exhaust gas purification catalyst according to claim 1, wherein the concentration of rhodium contained in the first region is from 1.0 mass % to 10 mass %, and the concentration of rhodium contained in the second region is not less than 0 mass % and less than 1.0 mass %.

3. The exhaust gas purification catalyst according to claim 1, wherein an amount of rhodium contained in the first region is from 0.35 g/L to 1.2 g/L in terms of metal relative to 1 liter of the three-dimensional structure, and an amount of rhodium contained in the second region is from 0.01 g/L to 0.3 g/L in terms of metal relative to 1 liter of the three-dimensional structure.

4. The exhaust gas purification catalyst according to claim 1, wherein the first region, the second region, and the region containing palladium further comprise cerium; and the concentration of cerium contained in the region containing palladium is higher than the concentration of cerium contained in either the first region and/or the concentration of cerium contained in the second region.

5. The exhaust gas purification catalyst according to claim 1, wherein the first region and the second region further comprise cerium, and the concentration of cerium contained in the second region is higher than the concentration of cerium contained in the first region.

6. The exhaust gas purification catalyst according to claim 1, wherein the first region, the second region, and the region containing palladium further comprise cerium, the concentration of cerium contained in the region containing palladium is from 13 mass % to 40 mass % in terms of $CeO_2$, and the concentration of cerium contained in either the first region and/or the concentration of cerium contained in the second region is not less than 0 mass % and less than 13 mass % in terms of $CeO_2$.

7. The exhaust gas purification catalyst according to claim 1, wherein the first region and the second region further comprise cerium, and the concentration of cerium contained in the first region is from 0 mass % to 4 mass % in terms of $CeO_2$, and the concentration of cerium contained in the second region is not less than 5 mass % and less than 13 mass % in terms of $CeO_2$.

8. The exhaust gas purification catalyst according to claim 1, wherein the first region, the second region, and the region containing palladium further comprise cerium, an amount of cerium contained in the region containing palladium is from 10 g/L to 50 g/L in terms of $CeO_2$ relative to 1 liter of the three-dimensional structure, and an amount of cerium contained in either the first region and/or an amount of cerium contained in the second region is not less than 0 g/L and less than 10 g/L in terms of $CeO_2$ relative to 1 liter of the three-dimensional structure.

9. The exhaust gas purification catalyst according to claim 1, wherein the first region, the second region, and the region containing palladium further comprise cerium, when the cerium in the region containing palladium is a cerium complex oxide (3), the cerium in the first region is a cerium complex oxide (1) and the cerium in the second region is a cerium complex oxide (2), the cerium complex oxide (3) has a higher concentration of cerium in terms of $CeO_2$ than either the cerium complex oxide (1) and/or the cerium complex oxide (2).

10. The exhaust gas purification catalyst according to claim 1, wherein the second region further comprises cerium complex oxide (2), the first region further comprises cerium complex oxide (1), and the cerium complex oxide (2) in the second region has the same or higher concentration of cerium in terms of $CeO_2$ in comparison to the cerium complex oxide (1) in the first region.

11. The exhaust gas purification catalyst according to claim 1, wherein the first region, the second region, and the region containing palladium further comprise cerium, the amount of cerium contained in the cerium complex oxide (3) in the region containing palladium is from 30 mass % to 70 mass % in terms of $CeO_2$, and the amount of cerium contained in the cerium complex oxide (2) in the second region is not less than 5 mass % and less than 30 mass % in terms of $CeO_2$.

12. The exhaust gas purification catalyst according to claim 1, wherein the amount of palladium contained in the region containing palladium is from 0.1 g/L to 20 g/L in terms of metal relative to 1 liter of the three-dimensional structure, and the concentration of palladium contained in the region containing palladium is from 1 mass % to 10 mass %.

13. The exhaust gas purification catalyst according to claim 1, wherein the amount of all components provided in each region is greater in the region containing palladium than the second region and is greater in the second region than the first region;

and relative to 1 liter of the three-dimensional structure, the amount of all components provided in the region containing palladium is from 50 g/L to 150 g/L, the amount of all components provided in the first region is not less than 10 g/L and less than 60 g/L, and the amount of all components provided in the second region is from 50 g/L to 90 g/L.

14. The exhaust gas purification catalyst according to claim 1, wherein the three-dimensional structure is from 30 mm to 200 mm, the region containing palladium is from 60% to 100% relative to the length of the three-dimensional structure, the first region is from 20 mm to 50 mm, and the second region is provided on the region containing palladium, at a portion where the first region is not provided at the outflow side of exhaust gas.

15. A method for purifying exhaust gas, comprising purifying exhaust gas using the exhaust gas purification catalyst according to claim 1.

* * * * *